United States Patent [19]

Saltman

[11] Patent Number: 4,871,810
[45] Date of Patent: Oct. 3, 1989

[54] COMPOSITION COMPRISING MELT BLENDED PRODUCT OF THERMOPLASTIC RESIN AND TWO ETHYLENE COPOLYMERS CONTAINING COREACTIVE GROUPS

[75] Inventor: Robert P. Saltman, Townsend, Del.

[73] Assignee: E. I. Du Pont de Nemours and Company, Wilmington, Del.

[21] Appl. No.: 117,942

[22] Filed: Nov. 13, 1987

[51] Int. Cl.$^4$ .............................................. C08L 23/08
[52] U.S. Cl. ...................................... 525/133; 525/185; 525/189; 525/201; 525/203; 525/208; 525/209; 525/217; 525/220; 525/221
[58] Field of Search ............... 525/286, 208, 193, 185, 525/189, 133, 201, 203, 209, 217, 220, 221

[56] References Cited

U.S. PATENT DOCUMENTS

| | | | |
|---|---|---|---|
| 3,600,468 | 8/1971 | Bohme | 260/897 |
| 3,886,227 | 5/1975 | VanBrederode et al. | 525/286 |
| 3,915,929 | 10/1975 | Kishikawa et al. | 260/42.18 |
| 4,211,691 | 7/1980 | FitzGerald et al. | 525/203 |
| 4,480,054 | 10/1984 | Enderle | 521/84.1 |
| 4,555,546 | 11/1985 | Patel | 525/194 |
| 4,619,969 | 10/1986 | Doi et al. | 525/93 |
| 4,696,967 | 9/1987 | Shedd et al. | 524/437 |
| 4,710,544 | 12/1987 | Wolfe | 525/194 |
| 4,758,629 | 7/1988 | Deyrup et al. | 525/208 |

FOREIGN PATENT DOCUMENTS

| | | | |
|---|---|---|---|
| 0196111 | 10/1986 | European Pat. Off. | 525/133 |
| 3421981 | 12/1985 | Fed. Rep. of Germany | 525/217 |
| 59-156881 | 2/1986 | Japan . | |
| 1238846 | 10/1986 | Japan | 525/208 |
| 2015326 | 1/1987 | Japan | 525/133 |

Primary Examiner—Wilbert J. Briggs, Sr.

[57] ABSTRACT

Partially grafted flexible thermoplastic compositions formed by melt blending under high shear, a thermoplastic material which does not contain available graft sites, said thermoplastic material being at least one continuous phase of the composition, an ethylene copolymer containing an unsaturated mono-carboxylic acid, and a polymeric grafting agent having reactive groups capable of reacting with the mono-carboxylic acid in the ethylene copolymer and with the available graft sites in the thermoplastic material.

9 Claims, No Drawings

COMPOSITION COMPRISING MELT BLENDED PRODUCT OF THERMOPLASTIC RESIN AND TWO ETHYLENE COPOLYMERS CONTAINING COREACTIVE GROUPS

DESCRIPTION

1. Technical Field

This invention relates to certain flexible thermoplastic compositions which possess a unique combination of unexpectedly superior high temperature properties. While conventional flexible thermoplastics may have useful combinations of properties at room temperature, generally such materials exhibit severe deterioration of high temperature properties, making these materials unsuited for applications such as automotive under-the-hood use. More specifically, this invention relates to flexible thermoplastic compositions derived from a minor proportion of a thermoplastic material, ethylene copolymers containing an acid moiety, and a multifunctional polymeric grafting agent derived from ethylene. The compositions of the present invention will be multi-phase blends of the thermoplastic material and the ethylene copolymers containing an acid moiety, and which blends have at least one continuous phase which is the thermoplastic. The thermoplastic component does not contain functional groups available for grafting reactions, therefore, the ethylene copolymer component which contains the acid moiety, and the polymer grafting agent, must be selected such that each component individually has low interfacial energy, or equivalently, good interfacial adhesion, between them and the thermoplastic matrix. Low interfacial energy between the phases is defined as blending in a pairwise manner the ethylene copolymer containing an acid moiety with the thermoplastic, and the ethylenically-based polymeric grafting agent with the thermoplastic. After injection molding, these blends are subjected to tensile testing (ASTM D-1708) at ambient temperatures and the rupture surface is examined for signs of delamination. If delamination is not observed, the components are suitable for the application of the current invention.

The compositions of the present invention have potential for use in a wide range of applications. For example, the combination of good high temperature properties suggests under-the-hood use in automotive applications. A good balance of oil and chemical resistance makes these compositions suitable for use in hose and tubing applications. Excellent toughness suggests utility for these compositions in appliance housing and automotive bumpers. The combination of good retention of high temperature properties, good low temperature flexibility, and excellent electrical properties open a variety of wire and cable coating applications for these materials. These compositions readily accept flame retardants, making them useful for commercial applications requiring low flammability. Irradiation of these materials yields substantial physical property improvements making them useful as heat shrinkable jacketing materials and cable connectors. The good melt strength of these compositions makes them amenable to foaming. They can be filled with short fibers such as glass, graphite, or Kevlar ® aramid fibers to increase their modulus and improve their load bearing capability at elevated temperatures. These materials readily accept clay, mica and other mineral fillers to be useful as sound, or vibrational damping materials, as well as glass spheres to lower the buoyant density.

2. Background Art

U.S. Pat. No. 4,555,546 granted Nov. 26, 1985 to Patel, discloses compositions that contain cured acrylic ester copolymer rubber and a polyolefin resin, e.g., polyethylene, together with a particular compatibilizing agent. The compatibilizing agent is a graft copolymer of an olefin polymer compatibilizing segment derived from homo or copolymers of $C_2$–$C_8$ mono-olefins, polybutadiene, polyisoprene and polyalkenomer and an acrylic acid copolymer rubber compatibilizing segment. It is disclosed that the latter type compatibilizing segments can be drived from an epichlorohydrin polymer, nitrile rubber, urethane polymer, vinyl chloride polymer, polyamide, polyamine, acrylic polymer, polyester, and acrylic ester copolymer rubber. Also, Patel discloses in broad, general language what is meant by suitable acrylic ester copolymer rubbers and equates all such copolymer rubbers regardless of the type of cure-site found thereon. The examples disclose only that the acrylic acid copolymer rubber is ethylene/methyl acrylate/carboxylic acid copolymer. Patel teaches that you cannot obtain a blend of polymers having good physical properties without the compatibilizing agent. In the present invention, ethylene copolymers containing an acid moiety and polymeric grafting agents are selected such that each has low interfacial energy with the thermoplastic material which does not contain available graft sites. Therefore, no compatibilizing agent is necessary nor would it be expected to improve the physical properties.

Japanese Patent Application No. 59-156881 discloses compositions from 50 to 99.9 weight percent polyolefin (51 to 100 volume percent) and 0.1 to 50 weight percent of olefin copolymer containing epoxide groups. They describe a physical blend and nowhere do they describe crosslinking or grafting of the polyolefin containing epoxide groups. No third ethylene copolymer containing an acid moiety is disclosed. Finally, there is no particular restriction of the olefin copolymer containing epoxide groups, i.e., ranging from 0.05-95 weight percent epoxy; the current invention uses ethylene copolymers containing a relatively narrow range of epoxide.

U.S. Pat. No. 4,710,544 issued Dec. 1, 1987 to Wolfe discloses blends of certain nonpolar crystalline polyolefin resins; e.g., polypropylene, and dynamically crosslinked high ethylene content (>50 weight % ethylene) ethylene/alkyl acrylate elastomers containing a cure site derived from 1,4-butenedioic acid. These compositions have excellent tensile strength values and high elongation at break. These compositions do not contain an ethylene copolymer containing an unsaturated mono-carboxylic acid nor a polymeric grafting agent containing reactive groups selected from epoxide, isocyanate, aziridine, silanes such as alkoxy or halo silanes, alkylating agents such as alkyl halides or alpha-halo ketones or aldehydes, or oxazoline reactive groups.

DISCLOSURE OF THE INVENTION

This invention relates to certain flexible thermoplastic compositions which posses a unique combination of unexpectedly superior high temperature properties.

These compositions may be gamma-irradiated or foamed, and also may contain glass, Kevlar ®, and other short-fiber reinforcement, graphite, glass beads, glass spheres, aluminum silicate, asbestos, clay, mica, calcium carbonate, barium sulfate, and the like and combinations of such materials. Glass, Kevlar®, clay and barium sulfate are preferred. In addition, flame retardants, plasticizers, pigments, antioxidants, ultraviolet light and heat stabilizers, carbon black, and nucleating agents can be used. In particular, this invention relates to the flexible thermoplastic compositions derived from a variety of thermoplastics and ethylene copolymers containing an acid moiety. Since these thermoplastics do not contain any available grafting sites, the surprisingly high temperature performance properties are achieved by forcing the thermoplastic into the continuous phase by combining the ethylene copolymer containing an acid moiety and the grafting copolymer. Since no grafting reaction occurs between either the polymeric grafting component, and the thermoplastic component, or between the ethylene copolymer containing an acid moiety, and the thermoplastic component, compositions that exhibit outstanding retention of high temperature properties are preferably selected from among components that when combined have low interfacial energy.

It is possible to determine empirically components that possess low interfacial energy. This can be accomplished by combining the three polymeric components in a pairwise fashion in approximately the same ratio as they would appear in the final composition. Afterwards, tensile measurements are done according as ASTM D-1708 and if no delamination is observed at the rupture surface, then these components are suitable to be used in the current invention. Several suitable components are provided in the Examples, but by no means do these represent the scope of suitable components that are useful for compositions of this invention. Further, details as to the selection of suitable components are given in the embodiment of this invention.

It is generally not advantageous to have excess reactive groups from the polymeric grafting agent, component (c), in the blend after reaction with the acid groups of the acid-containing copolymers, component (b), i.e., the total concentration of reactive sites from the amount of polymeric grafting agent, component (c), present in the blend should be at most equal to or less than the total number of acid groups available for reaction from the acid copolymer, component (b), contained in the blend. If an excess of grafting agent, component (c), is present, the grafting agent may react with itself resulting in material with inferior properties.

More specifically, the present invention comprises flexible thermoplastic compositions formed bu melt blending under high shear:
  (a) 25-50 volume percent of at least one thermoplastic resin, which does not contain available graft sites and being selected from crystalline polyolefin resins, such as polyethylene, polypropylene or copolymers thereof, poly(butene-1), poly-4-methylpent-1-ene, polystyrene and its copolymers such as acrylonitrile-butadiene-sytrene, styrene-acrylonitrile, styrene-butandiene, and styrene-alpha-methylstyrene, polyphenylene oxide, polyphenylene sulfide and polysulfone,
  (b) 10-74 volume percent of at least one ethylene copolymer, E/X/Y, where E is ethylene at least 50 weight percent, X is from 1-35 weight percent of an acid-containing unsaturated mono-carboxylic acid, and Y is from 0-49 weight percent of a moiety derived from at least one alkyl acrylate, alkyl methacrylate, alkyl vinyl ether, carbon monoxide, sulfur dioxide, or mixtures thereof where the alkyl groups contain 1-12 carbon atoms, and further wherein the acid groups in the acid-containing moiety are neutralized from 0-100% by a metal ion, and
  (c) 1-50 volume percent of at least one polymeric grafting agent which contains reactive groups selected from at least one of epoxides, isocyanates, aziridine, silanes such as alkoxy or halo silanes, alkylating agents such as alkyl halides or alpha-halo ketones or aldehydes, or oxazoline, that react with the acid-containing moieties in component (b) and wherein the quantity of reactive groups provided to the composition by the grafting agent expressed as MMOLS of reactive groups per one hundred grams of component (b) plus component c) is between 1 and 35; and further wherein the weight percent of the monomer(s) containing the reactive groups is 0.5-15 weight percent of the polymeric grafting agent, component (c). The remainder of the polymeric grafting agent contains at least 50 weight percent of ethylene and from 0-49 weight pecent of a moiety derived from at least one alkyl acrylate, alkyl methacrylate, alkyl vinyl ether, carbon monoxide, sulfur dioxide or mixtures thereof where the alkyl groups contain 1-12 carbon atoms.

The above percentages are based on the total of component (a), component (b), and component (c) only and are calculated from the densities of the individual components prior to mixing.

Preferred compositions of the present invention comprise flexible thermoplastic compositions formed by melt blending under high shear:
  (a) 27-48 volume percent of at least one thermoplastic resin, which does not contain available graft sites, the thermoplastic having a number average molecular weight of at least 7500 and being selected from crystalline polyolefin resins, such as polyethylene, polypropylene or copolymers thereof,
  (b) 20-69 volume percent of at least one ethylene copolymer, E/X/Y, where E is ethylene at least 55 weight percent, X of the copolymer is from 3-30 weight percent of an unsaturated mono-carboxylic acid and Y is from 0-35 weight percent of a moiety derived from at least one alkyl acrylate, alkyl methacrylate, or mixtures thereof where the alkyl groups contain 1-8 carbon atoms, and further wherein the acid groups in the unsaturated mono-carboxylic acid are neutralized from 0-80% by at least one metal ion selected from the group consisting of sodium, zinc, magnesium, calcium, potassium, and lithium; and
  (c) 4-35 volume percent of at least one polymeric grafting agent containing reactive groups selected from epoxides, derived from 4-11 carbon atoms that react with the acid containing moieties in component (b) and wherein the quantity of reactive groups provided to the composition by the grafting agent expressed as MMOLS of reactive groups per 100 grams of component (b) plus component (c) is between 5 and 30; and further wherein the weight percent of the monomer(s) containing the reactive groups is 1-10 weight percent of the polymeric grafting agent, component (c). The remainder of the polymeric grafting agent contains at least 55 weight percent of ethylene and from 0-35 weight percent of a moiety drived from at least one alkyl acrylate, alkyl methacrylate, or mixtures thereof where the alkyl, groups contain 1-8 carbon atoms.

Most preferred compositions of the present invention comprise flexible thermoplastic compositions formed by melt blending under high shear:

(a) 28-46 volume percent of at least one confunctionalized polypropylene resin, having a number average molecular weight of at least 10,000;

(b) 30-65 volume percent of at least one ethylene copolymer, E/X/Y, where E is ethylene at least 60 weight percent, X of the copolymer is from 5-15 weight percent of an acid-containing moiety selected from methacrylic or acrylic acid, and Y of the copolymer is from 0-25 weight percent of methyl acrylate, iso-butyl acrylate, or n-butyl acrylate, and further wherein the acid groups are neutralized from 30-70% by at least one metal ion selected from sodium, zinc, magnesium, or calcium ions; and (c) 7-25 volume percent of at least one polymeric grafting agent which contains reactive groups selected from epoxides derived from glycidyl methacrylate or glycidyl acrylate that react with the acid containing moieties in component b) and wherein the quantity of reactive groups provided to the composition by the grafting agent expressed as MMOLS of reactive groups per 100 grams of component (b) plus component (c) is between 10 and 25; and further wherein the weight percent of the monomer(s) containing the reactive groups is 1-7 weight percent of the polymeric grafting agent, component (c). The remainder of the polymeric grafting agent contains at least 60 weight percent of ethylene and from 0-25 weight percent of methyl acrylate, iso-butyl acrylate or n-butyl acrylate.

The components described above are melt blended with each other under high shear. The various ingredients may first be combined with one another in what is commonly referred to as a "salt and pepper" blend, i.e, a pellet blend, of each of the ingredients, or they may be combined with one another via simultaneous or separate metering of the various components, or they may be divided and blended in one or more passes into one or more sections of mixing equipment such as an extruder, Banbury, Buess Kneader, Ferrell continuous mixer, or other mixing equipment. For example, one can use an extruder with two or more feed zones into which one or more of the ingredients may be added sequentially. In this case, it is sometimes advantageous that the thermoplastic and polymeric grafting component be combined first, then the acid-containing copolymer be added downstream. This helps to maintain the thermoplastic, component (a), as the continuous phase during compounding, to aid processibility. However, the order of addition does not have any effect on the high temperature properties described by this invention. The high shear insures proper dispersion of all the components such as would be necessary to carry out the grafting reaction. In addition, sufficient mixing is essential to achieve the morphology which is necessary in the compositions of the present invention. The morphology required for the compositions of the present invention is that at least one of the continuous phases must be the thermoplastic, i.e., component a). Note that the thermoplastic component (a), is at least one of the continuous phases in all of the compositions of the present invention even though the thermoplastic, component (a), comprises less, and in fact, in many cases substantially less than 50 volume percent.

Suitable polyolefin resins comprise solid, high molecular weight resinous plastic material made by polymerizing such olefins as ethylene, propylene, butene-1, pentene-1, 4-methylpent-1-ene, etc., in conventional manner. Thus, such crystalline polyolefins as polyethylene (either of the low density [e.g., 0.910-0.925 g/cc], medium density [0.926-0.940 g/cc] or high density [e.g., 0.941-0.965 g/cc] type) may be used, whether prepared by high pressure processes or low pressure processes, including linear polyethylene. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see "Polyolefins", N.V. Boenig, Elsevier Publishing Co., N.Y., 1966). Polypropylene is a most preferred polyolefin plastic, having highly crystalline isotactic and syndiotactic forms. Frequently the density of polypropylene is from 0.800-0.980 g/cc. Largely isotactic polypropylene having a density of from 0.900-0.910 g/cc may be mentioned particularly.

Other suitable thermoplastics include polystyrene, styrene-acrylonitrile preferred styrene-acrylonitrile with 20-30 weight percent acrylonitrile, acrylonitrile-butadiene-styrene copolymers including blends and grafts of styrene-acrylonitrile copolymers and acrylonitrile-butadiene rubbers, and styrene-alpha-methylstyrene copolyemrs. In addition, poly(2,6-dimethyl-1,4-phenylene oxide) and phenylene ether copolymers formed from 2,6-dimethylphenol and 2,3,6-trimethylphenol can be used in this invention. Polyphenylene sulfide of the general formula

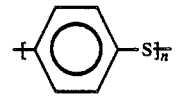

can also be used and finally polysulfones formed from diaryl sulfones and polyethersulfones formed from the diaryl sulfone group in combination with an ether such as bisphenol A.

Suitable ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/ethyl vinyl ether, ethylene/methacrylic acid/butyl vinyl ether, ethylene/acrylic acid/methyl acrylate, ethylene/methacrylic acid/methylacrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether.

Preferred ethylene copolymers that contain an acidic moiety for use in the compositions of the present invention include ethylene/methacrylic acid, ethylene/acrylic acid, ethylene/methacrylic acid/n-butyl acrylate, ethylene/acrylic acid/n-butyl acrylate, ethylene/methacrylic acid/ methyl acrylate and ethylene/acrylic acid/methyl acrylate copolymers. The most preferred ethylene copolymers for use in the compositions of the present invention are ethylene/methacrylic acid, ethylene/acrylic acid copolymers, ethylene/methacrylic acid/n-butyl acrylate and ethylene/methacrylic acid/methyl acrylate terpolymers.

Polymeric grafting agents suitable for use in this invention include ethylene copolymers copolymerized with monomers containing one or more reactive moieties, said monomers selected from unsaturated epoxides of 4-11 carbon atoms, such as glycidyl acrylate, glycidyl methacrylate, allyl glycidyl ether, vinylglycidyl ether, and glycidyl itaconate, unsaturated isocyanates of 2-11 carbon atoms, such as vinyl isocyanate and isocyanato-ethyl methacrylate, and monomers containing aziridine, silanes such as alkoxy or halo silanes, alkylating agents such as alkyl halides or alpha halo ketones or aldehydes or oxazoline, and the polymeric grafting agent may additionally contain an alkyl acrylate, alkyl methacrylate, carbon monoxide, sulfur dioxide and/or vinyl ether, where the alkyl groups contain 1-12 carbon atoms.

Preferred grafting agents for use in the compositions of the present invention include ethylene/glycidyl acrylate, ethylene/n-butyl acrylate/glycidyl acrylate, ethylene/methyl acrylate, glycidyl acrylate, ethylene/glycidyl methacrylate, ethylene/n-butyl acrylate/glycidyl methacrylate and ethylene/methyl acrylate/glycidyl methacrylate copolymers. The most preferred grafting agents for use in the compositions of the present invention are copolymers derived from ethylene/n-butyl acrylate/glycidyl methacrylate and ethylene/glycidyl methacrylate.

In addition to component (a), component b) and component (c) discussed above, the flexible thermoplastic compositions of the present invention may include other ingredients as are used in the conventional compounding of thermoplastics and/or ethylene copolymers, provided that such additional ingredients are no more than 100 parts by weight per 100 parts of the total of component (a), plus component (b) plus component (c). Examples of such other ingredients include carbon black, glass fibers, graphite fibers, Kevlar ® fibers, glass spheres, plasticizers, lubricants, silica, titanium dioxide, pigments, clay, mica and other mineral fillers, flame retardants, antioxidants, UV stabilizers, heat stabilizers and processing aids.

Below are given representative extrusion conditions for a single-feed extrusion in which all ingredients are combined in a "salt and Pepper" fashion.

Representative extrusion conditions for the polypropylene compositions shown in Table IV are:

| Screw speed (rpm) | Zone 1 temp. (°C.) | Zone 2 temp. (°C.) | Zone 3 temp. (°C.) | Zone 4 temp. (°C.) | Zone 5 temp. (°C.) | Die temp. (°C.) |
|---|---|---|---|---|---|---|
| 175 | 130 | 190 | 210 | 210 | 170 | 170 |

Melt temperature: 225° C.

Examples 17 to 24 and Comparative Example 24 were prepared in a System 40 Haake rheocord using a Banbury attachment. They were prepared by charging the Banbury with the polypropylene, component a, polymeric grafting agent, component c, and anti-oxidant components, and blending for 2 minutes at 210° C. Then the clay and plasticizer(s) were added and blended at 210° C. for an additional two minutes. Finally, component b was added and the entire mixture was blended for an additional five minutes.

Representative injection molding temperature profiles for the polypropylene compositions that appear in Table IV are:

| Rear temp. (°C.) | Center temp. (°C.) | Front temp. (°C.) | Nozzle temp. (°C.) | Mold temp. (°C.) |
|---|---|---|---|---|
| 170 | 210 | 210 | 170 | 25-35 |

For Examples 17 to 24 and Comparative Example 24 of Table IV, insufficient material was produced to injection mold plaques for test specimens. These samples were compression molded into 1/16" plaques from which test specimens were died out and physical properties measured. Representative compression molding conditions foro the above are:

(1) Preheat the press to 220° C.,
(2) Insert the sample and hold with no pressure for 2 minutes,
(3) Compress to 10,000 psi and release,
(4) Compress to 20,000 psi and hold for 3-5 minutes,
(5) Cool press to 45° C. and remove sample.

A number of physical properties were measured for each composition. Unless otherwise noted, the samples were prepared and tested as follows. Melt Indices of the ethylene copolymers and the grafting agents were determined according to ASTM D-1238. Tensile properties (tensile strength and elongation) at room temperature, 100° C. and 150° C. were measured by ASTM Procedure D-1708.

In addition, all of the injection molded test specimens were died out at a 45° angle from the machine direction. Samples were also tested for volume swell in ASTM #3 oil at 100° C. according to ASTM D-471. All samples for oil swell measurements were ⅛" (3.18 mm) thick. Other tests performed include hardness (ASTM D-2240), and compression set (ASTM D-395). The ethylene copolymers, grafting agents, and additives used in the Examples are defined in the following Tables (I, II and III).

In the following Examples, all percentages of component a, component b and component c are given by volume. All additives are given in parts per hundred resin (phr) of component a plus component b plus component c. Finally, all values originally obtained in British units have been converted to S.I. units and rounded, where appropriate.

The polypropylene, component a), employed in the working examples herein below is an isotactic homopolymer having a melt flow rate (ASTM D1238) at 230° C. of 0.8 g/10 min. and a density of 0.91 g/cm³.

TABLE I

| | COMPONENT b | | | | | |
|---|---|---|---|---|---|---|
| Code | Ethylene (Wt %) | n-Butyl Acrylate (Wt %) | Methacrylic Acid (Wt %) | Approx. Degree of Neutralization (%) | Ion | Final Melt Index | Density (g/cc) |
| A | 66.9 | 24.5 | 8.6 | 70 | Zn | 0.5 | .94 |

TABLE I-continued

| | | COMPONENT b | | | | | |
|---|---|---|---|---|---|---|---|
| Code | Ethylene (Wt %) | n-Butyl Acrylate (Wt %) | Methacrylic Acid (Wt %) | Approx. Degree of Neutralization (%) | Ion | Final Melt Index | Density (g/cc) |
| B | 65 | 30 | 5 | 75 | Zn | 1.5 | .94 |

TABLE II

| | | COMPONENT c | | | |
|---|---|---|---|---|---|
| Code | Ethylene (Wt %) | N—Butyl Acrylate (Wt %) | Glycidyl Methacrylate (Wt %) | Melt Index (g/10 min) | Density (g/cc) |
| A | 68.6 | 26 | 1.4 | 12 | .94 |
| B | 64.6 | 28 | 5.25 | 20 | .94 |
| C | 61.8 | 28 | 8.2 | 4 | .94 |
| D | 61 | 34 | 5.25 | 6 | .94 |

TABLE III

| | ADDITIVES |
|---|---|
| A | tetrakis(methylene(3,5-di-tert-butyl-4-hydroxy-hydrocinnamate)methane |
| B | Titanium dioxide |
| C | Zinc Stearate |
| D | Clay |
| E | Di-tridecyl-di-adipate |

Examples 1, 2 and Comparative Example C-2 show compositions of the current invention in which the level of grafting is varied between about 0 to 8.0 MMOLS of reactive groups per one hundred grams of component b plus component c. In the presence of the polymeric grafting agent, component c, improved retentions of tensile strengths at 150° C. are observed as the grafting level is increased.

Example 3 and Comparative Example C-3 show that when the volume % of component b is too low, (<10 volume %), the room temperature tensile strength and elongation deteriorate. Examples 4 to 7 demonstrate that good high temperature properties are maintained over a wide range of concentrations of component b and component c.

Examples 8 to 14 show compositions of the current invention in which filler and plasticizer were added. Various amounts of plasticizer (from 10 to 40 phr), filler (from 10 to 20 phr), and grafting levels (10 to 20 MMOLS of reactive groups per one hundred grams of component b plus component c) were used. All examples exhibit good retention of tensile strength at 150° C. and excellent room temperature elongations at break. In addition, Examples 13 and 14 show that compression set is improved as the amount of grafting between component b and component c is increased. Even at the high levels of plasticizer used, little or no exudation is observed.

Examples 15 and 16 and Comparative Examples C-16 and C-16A show compositions of the current invention at about 50 volume percent of polypropylene. Comparative Example C-16A does not contain acid copolymer, component b. The room temperature tensile strength of this composition is poor, therefore the absolute value of the tensile strength at 150° C. is also poor; further, the room temperature elongation is poor. Comparative Example C-16 does not contain any grafting agent, component c. This composition shows better room temperature tensile strength and elongation than Comparative Example 16A but is still inferior to Examples 15 and 16 when both components are present. This is also true for the percent retention of tensile strength at 150° C.

Examples 17 to 24 and Comparative Example C-24 exemplify compositions in which the quantity of reactive groups vary from 13 to 38 MMOLS of reactive groups per one hundred grams of component b plus component c. These compositions furthermore contain from 15 to 60 phr plasticizer and 15 to 20 phr clay that result in materials that span a wide range of hardnesses. At grafting levels greater than about 10 MMOLS of reactive groups per one hundred grams of component b plus component c, the compression set resistance at 100° C. is dramatically improved. These Examples exhibit good room temperature elongations and tensile strengths at break, with high retention of tensile strengths at 100° C. Comparative Example C-24, in which the quantity of reactive groups exceed 35 MMOLS of reactive groups per one hundred grams of component b plus component c, exhibits reduced room temperature tensile strength and poor room temperature elongations at break. These compositions with higher levels of grafting exhibit about a 17 to 55% reduction in oil swell over those compositions with less grafting (Examples 4 to 7).

TABLE IV

| | EXAMPLES OF COMPOSITIONS CONTAINING POLYPROPYLENE | | | | | | | | |
|---|---|---|---|---|---|---|---|---|---|
| Expl No. | Vol. % Comp (a) | Comp (b) ID | Vol. % Comp (b) | Comp (c) ID | Vol. % Comp (c) | Quantity Reactive Groups[1] | Additive #1 ID | PHR Additive #1 | Additive #2 ID |
| 1 | 35.7 | B | 42.9 | A | 21.4 | 3.4 | A | 1.0 | |
| 2 | 36.5 | B | 49.5 | B | 13.9 | 8.0 | A | 1.0 | |
| C-2 | 36.4 | B | 63.6 | | 0.0 | 0.0 | A | 1.0 | |
| 3 | 41.9 | A | 48.1 | A | 10.0 | 1.7 | | 0.0 | B |
| C-3 | 42.7 | A | 6.1 | A | 51.1 | 8.7 | | 0.0 | B |
| 4 | 41.3 | A | 39.0 | A | 19.7 | 3.3 | | 0.0 | |
| 5 | 41.3 | B | 39.0 | A | 19.7 | 3.3 | | 0.0 | |
| 6 | 41.3 | A | 19.7 | A | 39.0 | 6.5 | | 0.0 | |
| 7 | 41.3 | B | 19.7 | A | 39.0 | 6.5 | | 0.0 | |
| 8 | 41.3 | B | 48.9 | B | 9.9 | 6.2 | | 0.0 | |
| 9 | 41.2 | B | 39.0 | A | 19.7 | 3.5 | | 0.0 | |
| 10 | 41.5 | B | 44.7 | A | 13.9 | 2.3 | A | 1.0 | |
| 11 | 41.5 | B | 44.7 | B | 13.9 | 8.7 | A | 1.0 | B |

TABLE IV-continued
EXAMPLES OF COMPOSITIONS CONTAINING POLYPROPYLENE

| | | | | | | | | | |
|---|---|---|---|---|---|---|---|---|---|
| 12 | 41.5 | B | 44.7 | B | 13.9 | 8.7 | A | 1.0 | |
| 13 | 30.2 | B | 49.7 | B | 20.1 | 10.6 | A | 0.4 | |
| 14 | 30.1 | B | 34.7 | B | 35.2 | 18.6 | A | 0.4 | |
| 15 | 49.6 | B | 34.6 | A | 15.9 | 3.1 | A | 1.0 | |
| 16 | 47.6 | B | 34.6 | B | 15.9 | 11.7 | A | 1.0 | |
| C-16 | 47.6 | B | 52.4 | | 0.0 | 0.0 | A | 1.0 | |
| C-16A | 47.6 | B | 0.0 | A | 52.4 | 9.7 | A | 1.0 | |
| 17 | 40.2 | B | 39.7 | D | 20.1 | 12.4 | A | 0.5 | |
| 18 | 40.2 | B | 19.6 | D | 40.2 | 24.9 | A | 0.5 | |
| 19 | 40.2 | B | 29.7 | B | 30.1 | 18.6 | A | 0.5 | |
| 20 | 40.2 | B | 34.7 | C | 25.1 | 24.3 | A | 0.5 | |
| 21 | 40.2 | B | 39.7 | B | 20.1 | 12.4 | A | 0.5 | |
| 22 | 30.1 | B | 34.7 | D | 35.2 | 18.6 | A | 0.5 | |
| 23 | 30.1 | A | 34.7 | B | 35.2 | 18.6 | A | 0.5 | |
| 24 | 40.2 | B | 29.6 | C | 30.2 | 29.1 | A | 0.5 | |
| C-24 | 40.2 | B | 19.6 | C | 40.2 | 38.8 | A | 0.5 | |

[1] MMOLS reactive groups/100 g (component b + component c)

| Expl No. | PHR Additive #2 | Additive #3 ID | PHR Additive #3 | Additive #4 ID | PHR Additive #4 | Additive #5 ID | PHR Additive #5 | Ten Str Break 23C MPa | % Elong Break 23C | % Elong Break 100C | % Elong Break 150C |
|---|---|---|---|---|---|---|---|---|---|---|---|
| 1 | 0.0 | | 0.0 | | 0.0 | 0 | 0.0 | 15.4 | 385 | | 648 |
| 2 | 0.0 | | 0.0 | | 0.0 | | 0.0 | 17.8 | 339 | | 368 |
| C-2 | 0.0 | | 0.0 | | 0.0 | | 0.0 | 12.9 | 447 | | 965 |
| 3 | 0.1 | | 0.0 | | 0.0 | | 0.0 | 13.8 | 323 | 716 | |
| C-3 | 0.1 | C | 0.1 | | 0.0 | | 0.0 | 7.6 | 95 | 471 | |
| 4 | 0.0 | | 0.0 | | 0.0 | | 0.0 | 16.8 | 400 | | >1000[2] |
| 5 | 0.0 | | 0.0 | | 0.0 | | 0.0 | 14.6 | 379 | | >1000[2] |
| 6 | 0.0 | | 0.0 | | 0.0 | | 0.0 | 13.8 | 309 | | >1000[2] |
| 7 | 0.0 | | 0.0 | | 0.0 | | 0.0 | 14.2 | 301 | | >1000[2] |
| 8 | 0.0 | | 0.0 | D | 15.1 | E | 15.1 | 10.0 | 251 | | 641 |
| 9 | 0.0 | | 0.0 | D | 20.1 | E | 40.2 | 7.4 | 266 | | 618 |
| 10 | 0.0 | | 0.0 | | 0.0 | E | 30.0 | 8.4 | 321 | | >750[2] |
| 11 | 4.0 | | 0.0 | | 0.0 | E | 30.0 | 10.9 | 261 | | 334 |
| 12 | 0.0 | | 0.0 | | 0.0 | E | 40.0 | 8.8 | 234 | | 224 |
| 13 | 0.0 | | 0.0 | D | 20.1 | E | 40.2 | 9.9 | 243 | | |
| 14 | 0.0 | | 0.0 | D | 20.1 | E | 40.2 | 9.9 | 208 | 263 | |
| 15 | | | | | 0.0 | | 0.0 | 19.3 | 498 | | 867 |
| 16 | | | | | 0.0 | | 0.0 | 22.6 | 392 | | 368 |
| C-16 | | | | | 0.0 | | 0.0 | 16.6 | 480 | | >1000[2] |
| C-16A | | | | | 0.0 | | 0.0 | 8.7 | 120 | | 575 |
| 17 | | | | D | 15.1 | E | 15.1 | 16.6 | 284 | 353 | 366 |
| 18 | | | | D | 15.1 | E | 15.1 | 13.8 | 261 | 356 | 338 |
| 19 | | | | D | 15.1 | E | 15.1 | 17.6 | 294 | 390 | 320 |
| 20 | | | | D | 20.1 | E | 40.2 | 10.5 | 184 | 249 | 68 |
| 21 | | | | D | 20.1 | E | 40.2 | 12.6 | 238 | 359 | 61 |
| 22 | | | | D | 20.1 | E | 40.2 | 9.4 | 220 | 263 | 58 |
| 23 | | | | D | 20.1 | E | 60.3 | 7.6 | 192 | 210 | 63 |
| 24 | | | | D | 20.1 | E | 40.2 | 10.4 | 183 | 280 | 101 |
| C-24 | | | | D | 20.1 | E | 40.2 | 6.4 | 87 | 142 | 80 |

[2] Test was halted when this elongation was reached.

| Expl No. | % Ret Ten Str @ 100 C | % Ret Ten Str @ 150 C | #3 Oil 100C/70HR % Swell | Hardness Shore A | Hardness Shore D | Comp Set B 100C % Set |
|---|---|---|---|---|---|---|
| 1 | | 15.4 | | | | 95 |
| 2 | | 19.2 | | | | 90 |
| C-2 | | 12.6 | | | | 88 |
| 3 | 29.8 | | | | 53 | 95 |
| C-3 | 42.8 | | | | 40 | 54 |
| 4 | | >18.5[2] | 115 | 95 | 51 | 87 |
| 5 | | >16.3[2] | 136 | 96 | 47 | 86 |
| 6 | | >17.8[2] | 132 | 96 | 47 | 82 |
| 7 | | >18.2[2] | 134 | 95 | 47 | 81 |
| 8 | | 26.2 | 99.0 | 95 | 38 | 78 |
| 9 | | 16.3 | 114 | 90 | 30 | 79 |
| 10 | | >14.0[2] | | | | 88 |
| 11 | | 19.7 | | | | 75 |
| 12 | | 17.3 | | | | 77 |
| 13 | | | 87.6 | 82 | 38 | 49 |
| 14 | 41.6 | | | 80 | 37 | 39 |
| 15 | | 15.0 | | | | 95 |
| 16 | | 15.6 | | | | 93 |
| C-16 | | 13.9 | | | | 95 |
| C-16A | | 10.7 | | | | 83 |
| 17 | 50.0 | 25.0 | 85.0 | 93.0 | 38.0 | 58 |
| 18 | 53.9 | 23.5 | 96.0 | 89.0 | 35.0 | 46 |
| 19 | 56.8 | 22.1 | 81.0 | 90.0 | 35.0 | 49 |
| 20 | 43.9 | 5.4 | 61.0 | 85.0 | 39.0 | 49 |
| 21 | 48.7 | 1.3 | 61.0 | 81.0 | 26.0 | 43 |

TABLE IV-continued

EXAMPLES OF COMPOSITIONS CONTAINING POLYPROPYLENE

| | | | | | | |
|---|---|---|---|---|---|---|
| 22 | 41.5 | 3.1 | 92.0 | 76.0 | 33.0 | 40 |
| 23 | 31.3 | 2.3 | 80.0 | 75.0 | 32.0 | 45 |
| 24 | 46.9 | 5.2 | 63.0 | 84.0 | 37.0 | 54 |
| C-24 | 31.7 | 7.6 | 86.0 | 86.0 | 36.0 | 56 |

[2]Test was halted prior to sample break.

I claim:

1. A partially grafted, multi-phase, flexible thermomplastic composition formed by melt blending:
   (a) 25–50 volume percent of at least one thermoplastic resin selected from polyethylene, polypropylene and copolymers thereof, poly(butene-1), poly-4-methylpent-1-ene, polystyrene and copolymers thereof, polyphenylene oxide, polyphenylene sulfide and polysulfone, said thermoplastic comprising at least one continuous phase of the composition,
   (b) 10–74 volume percent of at least one ethylene copolymer, E/X/Y, where E is ethylene is at least 50 weight percent of E/X/Y, X is 1–35 weight percent of an acid-containing unsaturated mono-carboxylic acid, and Y is 0–49 weight percent of a moiety derived from at least one alkyl acrylate, alkyl methacrylate, alkyl vinyl ether, carbon monoxide, sulfur dioxide, or mixtures thereof where the alkyl groups contain 1–12 carbon atoms, and further wherein the acid groups in the acid-containing moiety are neutralized from 0–100% by a metal ion, and
   (c) 1–50 volume percent of at least one polymeric grafting agent which contains reactive groups selected from at least one of epoxides, isocyanates, aziridine, silanes, alkyl halides, alpha-halo ketones, alpha-halo aldehydes, or oxazoline, which grafting agents react with the acid-containing moieties in component (b) and wherein the quantity of reactive groups provided to the composition by the grafting agent expressed as MMOLS of reactive groups per one hundred grams of component (b) plus component (c) is between 1 and 35; and further wherein the weight percent of monomers containing the reactive groups is 0.5–15 weight percent of the polymeric grafting agent, component c, the remainder of the polymeric grafting agent contains at least 50 weight percent of ethylene and 0–49 weight percent of a moiety derived from at least one alkyl acrylate, alkyl methacrylate, alkyl vinyl ether, carbon monoxide, sulfur dioxide or mixtures thereof where the alkyl groups contain 1–12 carbon atoms, the above volume percentages for components (a), (b) and (c) being based on the total of component (a), component (b), and component (c) only and being calculated from the densities of the individual components prior to mixing.

2. The composition of claim 1, wherein component (a) is selected from polyethylenes, polypropylenes, and copolymers thereof.

3. The composition of claim 2 wherein component (a) is selected from polypropylenes.

4. The composition of claim 1 wherein component (a) is present in an amount of 27–48 volume percent, component (b) is present in an amount of 20–69 volume percent, and component (c) is present in an amount of 4–35 volume percent.

5. The composition of claim 4 wherein component (a) is present in an amount of 28–46 volume percent, component (b) is present in an amount of 30–65 volume percent, and component (c) is present in an amount of 7–25 volume percent.

6. The composition of claim 1 wherein component (b) comprises at least 55 weight % ethylene, 3–30 weight % of an unsaturated mono-carboxylic acid, and 0–35 weight % of a moiety derived from at least one alkyl acrylate, alkyl methacrylate and mixtures thereof where the alkyl radicals contain 1–8 carbon atoms and further where the acid groups in the unsaturated mono-carboxylic acid are neutralized from 0–80% by at least one metal ion selected from sodium, zinc, magnesium, calcium, potassium and lithium.

7. The composition of claim 6 wherein component (b) comprises at least 60 weight % ethylene, 5–15 weight percent of an acid-containing moiety selected from methacrylic acid and acrylic acid, and 0–25 weight percent of a moiety derived from at least one of methyl acrylate, iso-butyl acrylate and n-butyl acrylate, and further wherein the acid groups are neutralized from 30–70% by at least one metal ion selected from sodium, zinc, magnesium and calcium.

8. The composition of claim 1 wherein component (c) contains reactive groups selected from epoxides containing 4–11 carbon atoms, wherein the quantity of reactive groups, x, provided to the composition by component (c) expressed as MMOLS of reactive groups per 100 grams of component (b) plus component (c) is 5–30 and further wherein the weight percent of monomers containing reactive groups is 1–10 weight percent of the polymeric grafting agent, component (c), and the remainder of component (c) contains at least 55 weight % ethylene and 0–35 weight % of a moiety derived from at least one alkyl acrylate, alkyl methacrylate, or mixtures thereof where the alkyl radicals contain 1–8 carbon atoms.

9. The composition of claim 8 wherein component (c) contains reactive groups selected from epoxides derived from glycidyl methacrylate and glycidyl acrylate wherein the quantity of reactive groups, x, is 10–25 MMOLS of reactive groups per 100 grams of component (b) plus component (c).

* * * * *